(12) United States Patent
Velusamy et al.

(10) Patent No.: US 9,125,106 B1
(45) Date of Patent: Sep. 1, 2015

(54) MANAGEMENT OF QUALITY OF SERVICE POLICY CHANGES IN A COMMUNICATION NETWORK BASED ON WHETHER THE POLICY CHANGE IS AN UPGRADE OR A DOWNGRADE

(71) Applicant: Sprint Spectrum L.P., Overland Park, KS (US)

(72) Inventors: Saravana Velusamy, Olathe, KS (US); Ryan J. McGinn, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 163 days.

(21) Appl. No.: 14/023,722

(22) Filed: Sep. 11, 2013

(51) Int. Cl.
*H04W 28/16* (2009.01)
*H04W 8/18* (2009.01)
*H04W 76/04* (2009.01)
*H04W 88/16* (2009.01)
*H04L 12/24* (2006.01)
*H04L 12/917* (2013.01)

(52) U.S. Cl.
CPC .............. *H04W 28/16* (2013.01); *H04W 8/18* (2013.01); *H04W 76/04* (2013.01); *H04L 41/0893* (2013.01); *H04L 47/76* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2008/0316972 A1* | 12/2008 | Shaheen | 370/331 |
| 2010/0274878 A1* | 10/2010 | Yin et al. | 709/222 |
| 2012/0039175 A1* | 2/2012 | Sridhar et al. | 370/236 |
| 2012/0069749 A1* | 3/2012 | Famolari et al. | 370/252 |
| 2014/0086151 A1* | 3/2014 | Damola | 370/328 |
| 2014/0109173 A1* | 4/2014 | Barton et al. | 726/1 |
| 2014/0348029 A1* | 11/2014 | Lee et al. | 370/259 |
| 2015/0067769 A1* | 3/2015 | Barton et al. | 726/1 |

* cited by examiner

Primary Examiner — Min Jung

(57) ABSTRACT

A gateway may establish connectivity between a user equipment device (UE) and a network at a Quality of Service (QOS) indicated in a policy profile of the UE. Thereafter, the gateway may receive information indicating a change to the QOS and may transmit the information for receipt by the UE. If the gateway fails to receive an acceptance response from the UE, the gateway may then determine whether to update the QOS in the policy profile of the UE. On one hand, the gateway may update the QOS in the policy profile if the change to the QOS is a downgrade. On the other hand, the gateway may keep the QOS in the policy profile unchanged if the change to the QOS is an upgrade. The gateway may then enforce the QOS of the connectivity based on the policy profile of the UE.

20 Claims, 3 Drawing Sheets

MANAGEMENT OF QUALITY OF SERVICE POLICY CHANGES IN A COMMUNICATION NETWORK BASED ON WHETHER THE POLICY CHANGE IS AN UPGRADE OR A DOWNGRADE

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

When a cellular wireless network serves UEs, the network may allocate various resources to facilitate communication to and from the UEs. In an example arrangement, for instance, the network may allocate "bearers" that define physical or logical communication channels extending between the UEs and a transport network. Each such bearer may include a radio-bearer component that extends between a UE and a serving base station and an access-bearer component that extends between the serving base station and the transport network. Further, each such bearer may have an associated service level, such as "best effort" or "guaranteed bit rate" for instance, to support a particular quality of service (QOS) or type of service.

In an example arrangement, a UE may subscribe to service with a network service provider and the UE's subscription may define a service plan that allows the UE to engage in particular types of communication at particular service levels. For instance, the UE's service plan may specify that for particular types of communication such as voice and other real-time data communication, the UE is entitled to engage in communication at a particular guaranteed bit rate, whereas for other types of communication such as file transfers and non-real time messaging services, the UE is entitled to engage in communication at merely a best effort service level according to which the network would serve the UE with whatever bit rate it can from time to time. Further, the UE's service profile may define other service level parameters beyond bit rate. In practice, the network may store a service profile record for the subscriber in a policy profile server such as a home subscriber server (HSS), and the network may then apply that service profile for the UE.

In the example arrangement, the network may also include a gateway that functions to provide connectivity with the transport network. When a UE enters into coverage of the network, the UE may engage in a registration or "attachment" process, through which the network authenticates the UE and the network establishes at least one bearer for the UE. In this process, the gateway may engage in signaling with the policy profile server to obtain a copy of the UE's service profile record and may store that record locally for reference. As data traffic then passes to and from the UE through the gateway, the gateway may then enforce the UE's service level as defined by the UE's service profile record.

For example, if the UE's service profile specifies that the UE is guaranteed to engage in data communication at a particular guaranteed bit rate, the gateway may work to ensure that data being communicated to or from the UE flows at least at that guaranteed bit rate. As another example, if the UE's service profile specifies that the UE is entitled to engage in data communication at up to a maximum bit rate, the gateway may work to ensure that data flowing to or from the UE does not flow at greater than that maximum bit rate. And as still another example, if the UE's service level specifies that the UE is allowed to engage in data communication at a "best effort" service level, the gateway may permit data to flow to and from the UE at whatever bit rate the gateway can support from time to time.

Furthermore, during the attachment process or at some other time, the gateway and/or another network element may transmit to the UE a specification of the UE's service profile, so that the UE can apply consistent service level restrictions. For example, if the service profile specifies that the UE is entitled to engage in a particular type of data communication at up to a maximum bit rate, the UE may limit its transmission of that type of data to be at no higher than that specified maximum bit rate.

OVERVIEW

Due to changes in a UE's subscription plan or for various other reasons, a service level specified by the UE's service profile may change. For example, the UE's service profile may change to specify a different guaranteed bit rate or maximum bit rate for particular types of communication, or the UE's service profile may change to specify guaranteed bit rate, maximum bit rate, or best effort service level for a communication that previously had a different service level. When a UE's service profile changes, the UE's service profile record at the policy profile server may be updated to reflect the change, and the policy profile server may then signal to the gateway to provide the gateway with indication of the update. In turn, the gateway may then signal to the UE, via one or more other network elements, to provide the UE with a service profile update. Through this process, the gateway and UE may thus both apply the service profile update, so as to facilitate communication to and from the UE in accordance with the changed service profile.

Unfortunately, however, the process of updating the UE to implement such a profile change may not work, or at least the gateway may perceive the update as not working. For example, the gateway may transmit to the UE an indication of the service profile change and may expect to receive an acknowledgement from the UE within a particular response period, but due to a network failure or other issue, the gateway's transmission may not make it to the UE or the UE may not respond to the transmission, so the gateway may not receive an acknowledgement from the UE. As another example, the UE may receive the transmission from the gateway but for one reason or another may reject the profile change and may send a negative acknowledgement or rejection response to the gateway. At issue in this type of scenario is then whether the gateway should or should not implement the UE's service profile change itself.

Disclosed herein is a method and corresponding apparatus to help manage enforcement of a UE's service level in situations such as this. In accordance with the disclosure, when a gateway receives an indication of a service profile update for a UE and the gateway transmits an indication of the profile update to the UE, the gateway will then determine whether the gateway receives from the UE an acceptance response (positive acknowledgement) for that profile update. If the gateway determines that it has not received an acceptance response from the UE, the gateway will then enforce the UE's changed service level only if or to the extent the change is a downgrade of the UE's service level.

In particular, if and to the extent the change to the UE's service profile is a downgrade of the UE's service level, then the gateway will enforce the downgraded service level change even though the gateway did not receive an acceptance response from the UE, and thus even though the UE may not also be enforcing the downgraded service level change. For instance, if the change is a reduction in the maximum bit rate to which the UE is entitled for a particular type of communication, the UE may continue transmit data at the higher maximum bit rate but as the gateway receives that data from the UE and outputs the data onto the transport network, the gateway may throttle or otherwise cap the output of the data to limit the output to the reduced maximum bit rate.

On the other hand, if and to the extent the change to the UE's service profile is an upgrade of the UE's service level, then the gateway will not enforce the upgraded service level change, since the presumption is (right or wrong) that the UE would also not be enforcing the upgraded service level change. For instance, if the change is an increase in the maximum bit rate to which the UE is entitled for a particular type of communication, the UE may continue to transmit data at the lower maximum bit rate, and so the gateway may similarly limit the UE's bit rate to the lower maximum level. Advantageously, the gateway thus need not reserve resources to serve the UE at the increased bit rate, since the presumption is that the UE would not be making use of that increased bit rate anyway.

Accordingly, in one respect, disclosed is a method, which may apply in a cellular wireless communication system or in another type of communication system. The method may involve a gateway providing connectivity between a UE and a network at a service level indicated in a gateway policy profile associated with the UE. The method may then involve the gateway receiving information indicative of a change to the service level. The change may correspond to an upgrade of the service level or a downgrade of the service level. Further, the method may involve the gateway transmitting the information for receipt by the UE. In turn, the method may then involve determining failure of the gateway to receive an acceptance response from the UE indicative of the UE accepting the change, and responsive to receiving the information by the gateway and the determining of the failure, (i) updating the gateway policy profile by the gateway to make the change if the change corresponds to the downgrade, or (ii) maintaining the gateway policy profile by the gateway unchanged if the change corresponds to the upgrade.

In another respect, disclosed is a system that may be configured to provide connectivity between a UE and a network. The system may include a policy rules server that includes a policy profile associated with the UE. The policy profile may be indicative of a quality of service (QOS) of the connectivity between the UE and the network. Further, the system may include a gateway configured to enforce the QOS of the connectivity between the UE and the network. The gateway may also be configured to: (i) receive information from the policy rules server indicative of a change to the policy profile, wherein the change corresponds to an upgrade of the QOS or a downgrade of the QOS, (ii) transmit the information for receipt by the UE, (iii) determine failure of the gateway to receive an acceptance response from the UE indicative of the UE accepting the change, and (iv) responsive to the determined failure after the transmission of the information by the gateway, enforce a decreased QOS if the change corresponds to the downgrade or keep the QOS unchanged if the change corresponds to the upgrade. In turn, the system may further include a base station serving the UE and configured to provide the connectivity to the UE via a bearer connection between the base station and the gateway.

Still further, disclosed is a gateway configured to provide connectivity between a UE and a network at a service level indicated in a gateway policy profile associated with the UE. The gateway may include a network communication interface, a processing unit, data storage, and program instructions stored in the data storage and executable by the processing unit to carry out various functions. The functions may include receiving information indicative of a change to the service level via the network communication interface. The change may correspond to an increase of the service level or a decrease of the service level. Further, the functions may include transmitting the information for receipt by the UE via the network communication interface. Still further, the functions may then include determining failure of the gateway to receive an acceptance response from the UE indicative of the UE accepting the change, and responsive to receiving the information by the gateway and determining the failure, updating the gateway policy profile to make the change only if the change corresponds to a decrease in the service level and not if the change corresponds to an increase in the service level.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a simplified block diagram of an example network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
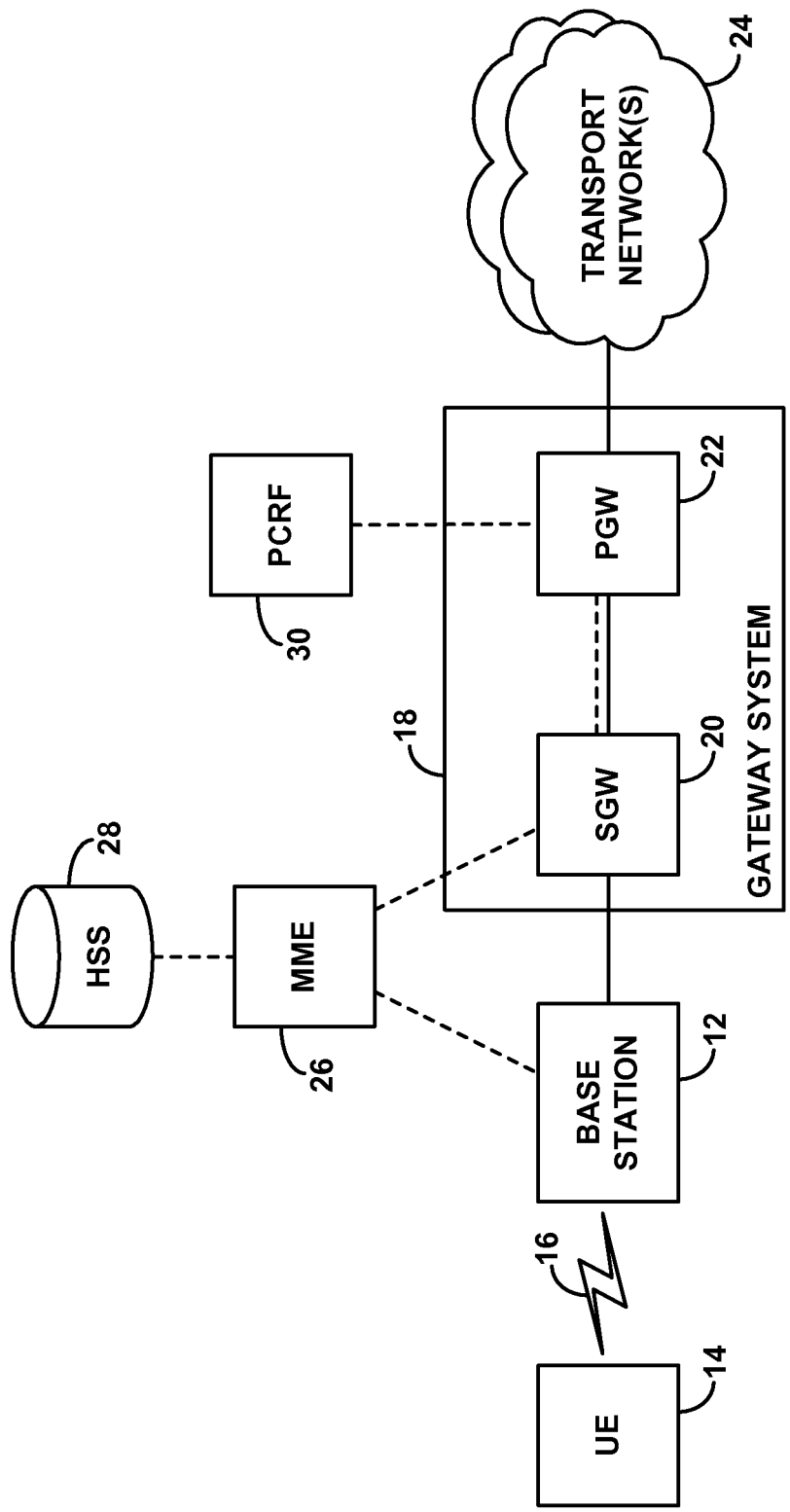
FIG. 1 is a simplified block diagram of a network arrangement in which aspects of the present disclosure can be implemented.

The arrangement of FIG. 1 includes by way of example a representative base station (e.g., eNodeB) 12 and a UE 14 within coverage of the base station 12. The base station and the UE may be configured to communicate with each other over a radio frequency air interface 16 according to any of a variety of air interface protocols, examples of which include Orthogonal Frequency Division Multiple Access (OFDMA) (e.g., LTE or Wireless Interoperability for Microwave Access (WiMAX)), Code Division Multiple Access (CDMA), Global System for Mobile Communications (GSM), and others now known or later developed.

As further illustrated, the arrangement includes a gateway system 18 comprising a representative serving gateway (SGW) 20 and a representative packet gateway (PGW) 22. The SGW 20 is configured to communicate with the base station 12 and with the PGW 22. The PGW 22 is then arranged to provide connectivity with one or more transport networks 24 such as the public Internet, various private application service networks, and/or public switched telephone networks for instance.

In addition, the PGW 22 may function as a controller and may be configured to carry out various functions described herein. The PGW 22 may include a network communication interface, a processing unit, data storage, and program instructions stored in the data storage and executable by the PGW 22 to carry out the various functions. Representative functions may include those discussed above, for instance. By way of example, the functions may include enforcing the service level (e.g., maximum bit rate) of the connectivity between the UE 14 and the transport network 24.

In addition, the arrangement includes a representative mobility management entity (MME) 26, which functions as a controller and may be configured to assist the PGW 22 in carrying out the various functions by facilitating the management of bearers for instance. The MME 26 is of the type that may operate in a cellular wireless communication system compliant with the Long Term Evolution (LTE) protocol for instance. The MME is configured to communicate with the base station 12 and with the SGW 20. Further, the MME is configured to communicate with a Home Subscriber Server (HSS) 28, which may store account and service profiles for various UEs, and with a Policy Charging and Rules Function (PCRF) 30, which functions as a policy decision point to authorize and control application of service logic by the MME for instance. Additionally, the PCRF 30 may function as the policy decision point to authorize and control the service level of the connectivity provided by the PGW 22 between the UE 14 and the transport network 24 for instance. For instance, the PCRF may provide information to the PGW to indicate a change to the service level in the UE's service profile as described in the examples above.

In practice, many of these components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network. As such, dashed lines may represent logical signaling links for carrying signal messages such as information indicating a change to a policy profile, and solid lines may represent logical bearer links for carrying bearer data such as web browsing data and VoIP signaling and traffic for instance.

With the example arrangement shown, when UE 14 is in the coverage of base station 12, the UE may attach to the base station over the air interface 16. When the UE is connected to the base station, the network may establish for the UE one or more bearers (e.g., solid lines in FIG. 1), such that the UE receives connectivity to the one or more transport networks 24. The established bearer may allow the UE to communicate with the transport network at a service level indicated in the UE's service profile (e.g., Quality of Service (QOS), guaranteed bit rate, maximum bit rate, etc.). Such bearer may include a connection between the base station and the SGW, a connection between the SGW and the PGW, and a connection between the PGW and the transport network for instance.

In particular, when the base station 12 receives an attach request from the UE, the base station may forward the attach request to the MME 26. The MME may then authenticate and authorize the UE and obtain from HSS 28 an indication of one or more application services at respective service levels to which the UE subscribes and may store an indication of those services in a context record for the UE, keyed to a UE identifier such as an International Mobile Subscriber Identity (IMSI) for instance. For each of the various services, the MME may then allocate for the UE a respective bearer ID (e.g., evolved packet system (EPS) bearer ID), which the MME may store in the UE context record in correlation with an identity of the base station for instance.

Further, the MME may engage in signaling with the PCRF (via the SGW) to indicate the bearer ID allocated for the UE and associated the UE's context record. In turn, the PCRF may engage in signaling with the PGW to cause the PGW to locally store a policy profile for the UE that includes the service level obtained from the UE's context record. Thus, the PGW may locally include a policy profile that indicates the service level for every UE connected to the transport network via the PGW. Further, for each such service, the MME may then engage in signaling with the SGW 20 and the base station 12 to set up a respective bearer associated with the bearer ID.

For instance, assuming the UE is authorized for general packet-data service, the MME may engage in signaling with the SGW 20 and the base station 12 to set up for the UE a bearer to carry general packet-data communication traffic. Further, if the UE is authorized for VoIP service, the MME may also engage in signaling with the SGW and the base station to set up for the UE another bearer to carry VoIP call setup signaling (e.g., SIP signaling). As discussed above, each of these bearers may have a corresponding service level, which might be keyed to the policy profile at the PGW for instance.

By way of example, the UE's service profile may authorize the UE for general packet-data service having a particular guaranteed bit rate. The MME may then engage in signaling with the SGW and the base station to establish for the UE a bearer to carry general packet-data communication traffic. The SGW may then indicate to the PCRF the bearer ID of the established bearer. The PCRF may then signal to the PGW the bearer ID, and the PGW may record in the UE's local policy profile the particular guaranteed bit rate of the established bearer based on the UE's context record associated with the bearer ID. In turn, the PGW may enforce the particular guaranteed bit rate indicated in the UE's local policy profile. Additionally, the base station may also transmit to the UE a specification of the bearer ID and the associated particular guaranteed bit rate, so that the UE may configure its data transmission over the established bearer to have the particular guaranteed bit rate.

The process of establishing each of these or other bearers may take various forms, the particular details of which are not critical. For instance, to set up each such bearer for a UE, the MME may create a bearer identity (e.g., evolved packet system (EPS) bearer identity). The MME may then send to the SGW 20 a create-session request message specifying the bearer identity. In response, the SGW may then create an entry for the UE in a bearer table that the SGW maintains, designating the bearer identity and an address or other identifier of the serving base station, and may further send to the PCRF a create-session request that includes the service level. The PCRF may then signal the PGW to cause the PGW to create an entry in a bearer table that the PGW maintains and a policy profile for the UE that the PGW maintains. The PGW may then send a create-session response to the SGW, and the SGW may send a create-session response to the MME. And the MME may responsively send to the base station an initial context setup request with an attach-accept message, providing the bearer identity (and perhaps an address or identity of the SGW), in response to which the base station may then allocate a radio bearer for UE communication of bearer data over the air interface 16. Additionally, the base station may relay information from the context to the UE, such as the service level associated with the allocated bearer.

Thus, once this process is complete, the UE may engage in communication with the transport network via the air interface, the bearer connection, the SGW, and the PGW at the service level indicated in the UE's service profile. For instance, the UE may send bearer traffic over the air interface to the base station, the base station may send the data over the bearer to the SGW, the SGW may send the data over the bearer to the PGW, and the PGW may send the data over to the transport network. Likewise, a message from the transport network can be sent to the PGW, the PGW may send the message to the SGW over the bearer, the SGW may then send that message to the base station over the bearer, and the base station may send that data over the air interface to the UE.

Under normal operation, in some instances, the PCRF 30 may provide policy update information to the PGW 22 that indicates a change in the service level indicated in the UE's service profile in the HSS. For instance, the UE's service profile may have been updated to indicate a service level that provides a changed maximum data bit rate than the current maximum data bit rate indicated in the UE's policy profile in the PGW. The information may include a quality of service class identifier (QCI) and/or an application service identifier that corresponds to the updated service level indicated in the HSS for instance.

In response, the PGW may transmit the policy update information for receipt by the UE. For instance, the PGW may transmit the information over a logical communication channel (e.g., dashed lines) to the MME, and the MME may transmit an update-bearer-request to the base station that includes the information for receipt by the UE. The base station may then transmit the information to the UE over the air interface 16 via a Radio Resource Control (RRC) Connection reconfiguration message, for instance, that specifies the applicable service level parameters such as the QCI. Alternatively, in some instances, the PGW may transmit the information for receipt by the UE over the bearer connection extending through the SGW and the base station.

Upon receiving the information via the base station, the UE may then store the bearer ID and any applicable service level parameters, such as the updated data transmission rate, and transmit an acceptance response to the base station. The acceptance response indicates that the UE acknowledges the receipt of the policy update information and accepts the change to the service level. The acceptance response may include an RRC Connection Reconfiguration Complete message to the MME, for instance, indicating that the UE accepts setup of the radio-bearer for air interface communication between the UE and the base station having the service level indicated by the transmitted policy update information. In this case, the MME may relay the acceptance response to the PGW over the logical communication channel for instance. Alternatively, the acceptance response may be provided in the bearer connection through the base station and SGW to the PGW for instance.

When the acceptance response from the UE 14 is received by the PGW, the PGW may then update the local policy profile associated with the UE 14 in the PGW's records. In turn, the PGW may enforce the changed service level indicated in the UE's updated policy profile. In this manner, the PGW may cause the network to re-establish the tunnel for communication between the base station and the transport network to have bearer type parameters that correspond to the updated service level for instance.

In an arrangement such as this, the issue addressed by the present disclosure may arise when the PGW fails to receive the acceptance response from the UE. For instance, as described above, communication between the PGW and the UE may fail or the UE may reject the change to the service level. In this scenario, the PGW will cause the network to update the bearer only if the change to the service level is a downgrade, whether or not the acceptance response is received. In this case, updating the bearer will reduce the allocated resources to the UE (e.g., by associating the UE with a bearer having a lower service level and freeing the bearer that has the higher service level). Additionally, in this case, if the UE attempts to communicate at the previous higher service level, the PGW may restrict the uplink bandwidth from the UE. In practice, the uplink bandwidth from the UE may be queued at the PGW by a mechanism such as Transfer Control Protocol (TCP) windowing for instance. In the TCP windowing example, the UE may be configured to stop transmitting data packets until the PGW indicates to the UE that the queue of previously sent packets was cleared for instance.

On the other hand, if the change to the service level is an upgrade, the PGW will cause the network to update the bearer only if the acceptance response from the UE is received. For instance, if the acceptance response was not received, the network may maintain the current bearer having the lower service level since the PGW has no indication that the UE has accepted the change to the service level. In this case, providing the bearer having the higher service level may not affect the quality of the UE's connectivity because the UE may still be communicating at the lower service level before the change. Thus, maintaining the bearer having the lower service level in this case may avoid allocating to the UE the bearer with the higher service level, at least until the acceptance response is received by the PGW from the UE.

In accordance with the present disclosure, as noted above, when the acceptance response is not received, a determination by the PGW of whether to enforce the changed service level can be made. For instance, the determination to update the UE's local policy profile in the PGW to the updated service level can be made if the change to the service level corresponds to a downgrade. Alternatively, the determination to keep the policy profile with the current service level unchanged can be made if the change to the service level corresponds to an upgrade, at least until the acceptance response is received. Thereafter, the PGW may enforce the service level indicated in the policy profile to the connectivity between the UE and the transport network, for instance, by causing the network to update and/or maintain the bearer that corresponds to the UE.

Figure 2:
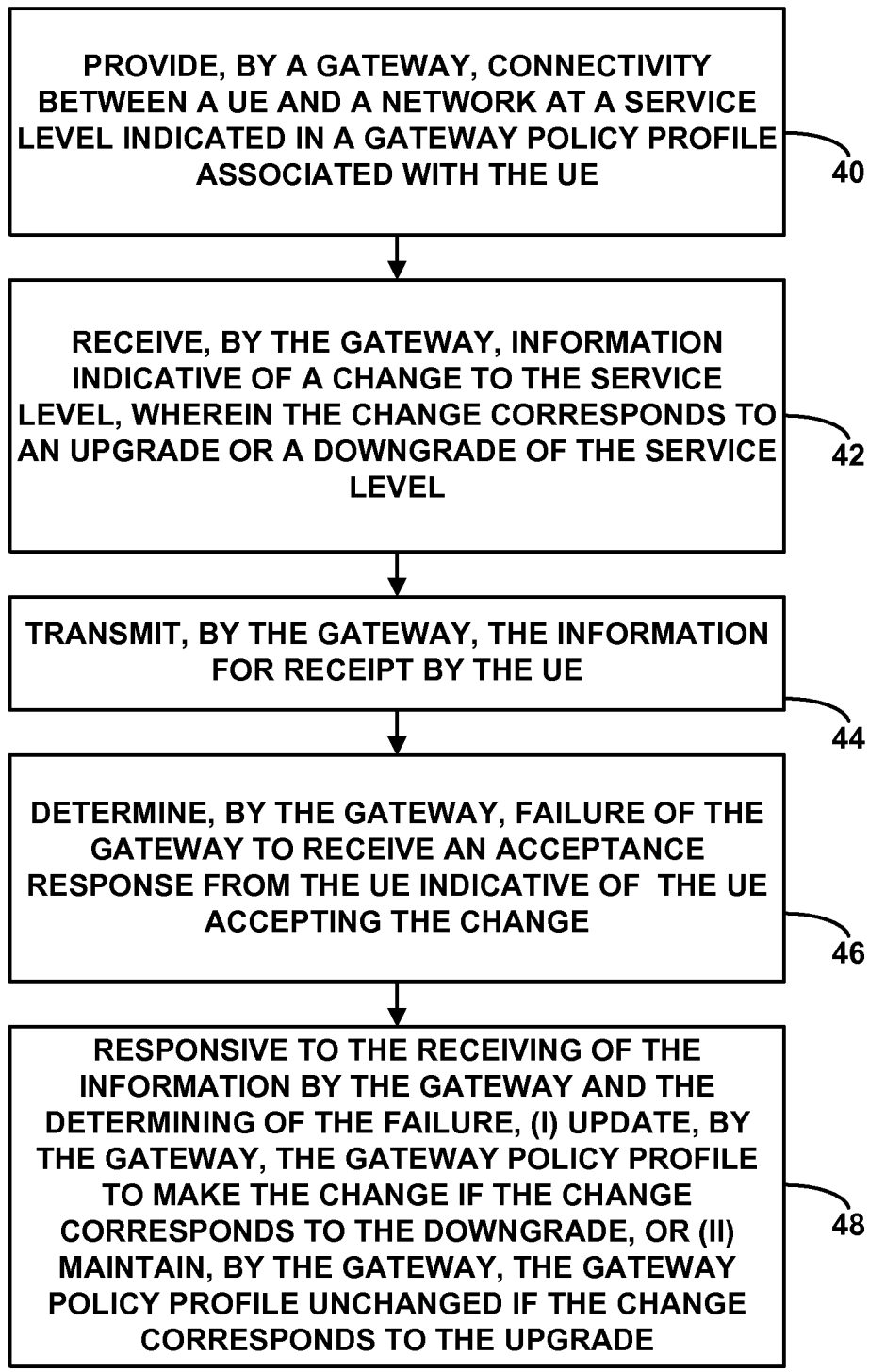
FIG. 2 is a flow chart depicting functions that can be carried out in accordance with the present disclosure.

FIG. 2 is a flow chart depicting functions that can be carried out in accordance with the present method. This method may be carried out in an arrangement such as that shown in FIG. 1, for instance, where a base station serves a UE over an air interface and is arranged to communicate with a gateway system that provides connectivity with a transport network. In this arrangement, the transport network may comprise the Internet or one or more other packet-switched networks for instance. Functions of the method may be carried out by various entities, such as the PGW 22 possibly in cooperation with one or more other entities such as the MME 26 for instance.

As shown in FIG. 2, at block 40, the method involves providing connectivity between a UE and a network by a gateway at a service level indicated in a gateway policy profile associated with the UE. To provide the connectivity, the gateway may establish a bearer of data and/or voice traffic between the UE and the network for instance. In an example scenario, the bearer may be configured to support the service level indicated in the gateway policy profile (e.g., maximum bit rate, QOS of voice call, etc.). Thus, once this bearer is established, the UE, base station, SGW, and PGW may have a record of the bearer correlated with applicable tunnels, so as to facilitate communication of bearer traffic between the UE and the transport network at the service level indicated by the gateway policy profile.

At block 42, the method involves receiving information that indicates a change in the service level. The change may correspond to an upgrade (e.g., increased maximum bit rate of data, increased quality of voice call, etc.) or a downgrade of the service level. For instance, the gateway may receive the information from an entity such as the PCRF 30 or any other entity configured to determine the policy enforced based on the gateway policy profile.

At block 44, the method then involves transmitting the information for receipt by the UE. The function of transmitting the information by the gateway for receipt by the UE may be carried out in various ways as described above. For instance, the information may be transmitted from the PGW to the UE via the SGW, MME and the base station. The provision of the information by the gateway to the UE may allow the UE to update its configuration and communicate at the changed service level for instance. On one hand, for instance, if the change is an upgrade to the data transmission rate, the UE may increase its data transmission rate over the bearer in response to receiving the information about the change from the gateway. On the other hand, for instance, if the change is a downgrade to the data transmission rate, the UE may decrease its data transmission rate over the bearer in response to receiving the information about the change from the gateway.

At block 46, the method next involves determining failure of the gateway to receive an acceptance response indicative of the UE accepting the change. The failure to receive the acceptance response may occur for various reasons. For instance, in one scenario, the UE may have responded to the receipt of the information with a rejection response indicating that the UE rejected the change to the service level instead of the acceptance response. In a second scenario, the UE may have not received the information from the gateway due to a failure in the communication system for instance. In a third scenario, the response from the UE may have failed to arrive to the gateway due to failure in the network for instance. In a fourth scenario, the gateway may determine the failure to receive the acceptance response by waiting a threshold period of time to receive the acceptance response, and determining failure when the threshold period of time passes without the gateway receiving the acceptance response for instance.

In normal operation, in response to receiving the information by the gateway indicating the change to the service level, the gateway may update the gateway policy profile only in response to receiving the acceptance response from the UE. In accordance with the method, however, when the gateway fails to receive the acceptance response from the UE, the gateway may update the gateway policy profile of the UE to make the change only if the change corresponds to the downgrade of the service level and not if the change corresponds to the upgrade of the service level. Thus, if the change to the service level is a downgrade, the gateway may limit the UE to a bearer having the downgraded service level. Further, if the change to the service level is an upgrade, the gateway may conserve the bearer having the upgraded service level until receiving the acceptance response from the UE confirming that the UE may attempt to communicate at the upgraded service level. Thus, at block 48, the method involves, responsive to the receiving of information by the gateway and the determining of the failure, (i) updating the gateway policy profile to make the change if the change corresponds to the downgrade, or (ii) maintaining the gateway policy profile unchanged if the change corresponds to the upgrade.

In an example scenario, the UE may be a tablet device connected to a data network through the gateway with a service level (e.g., maximum bit rate) indicated by a data plan that the UE is subscribed to. The service level may be stored in the gateway policy profile associated with the UE at the gateway for instance, and the gateway may be providing the connectivity to the network based on the service level indicated in the gateway policy profile. In that scenario, the gateway may receive information that the data plan has changed. For instance, the user of the UE may have subscribed to a new data plan having a different service level (e.g., maximum bit rate). The gateway may then transmit the information for receipt by the UE. In this scenario, the gateway may fail to receive an acceptance response from the UE indicating that the UE accepted the change. In response to the failure, if the change to the service level in the new plan is an upgrade, the gateway may keep the service level of the connectivity unchanged, since upgrading the connectivity may not be recognized by the UE and thus the UE may not utilize the upgraded service level (e.g., the UE may not utilize the higher maximum bit rate). If the change to the service level in the new plan is a downgrade, the gateway may reduce the service level of the connectivity to the downgraded service level (e.g., lower maximum bit rate) and thus conserve bandwidth between the gateway and the UE even if the UE does not accept the change.

Figure 3:
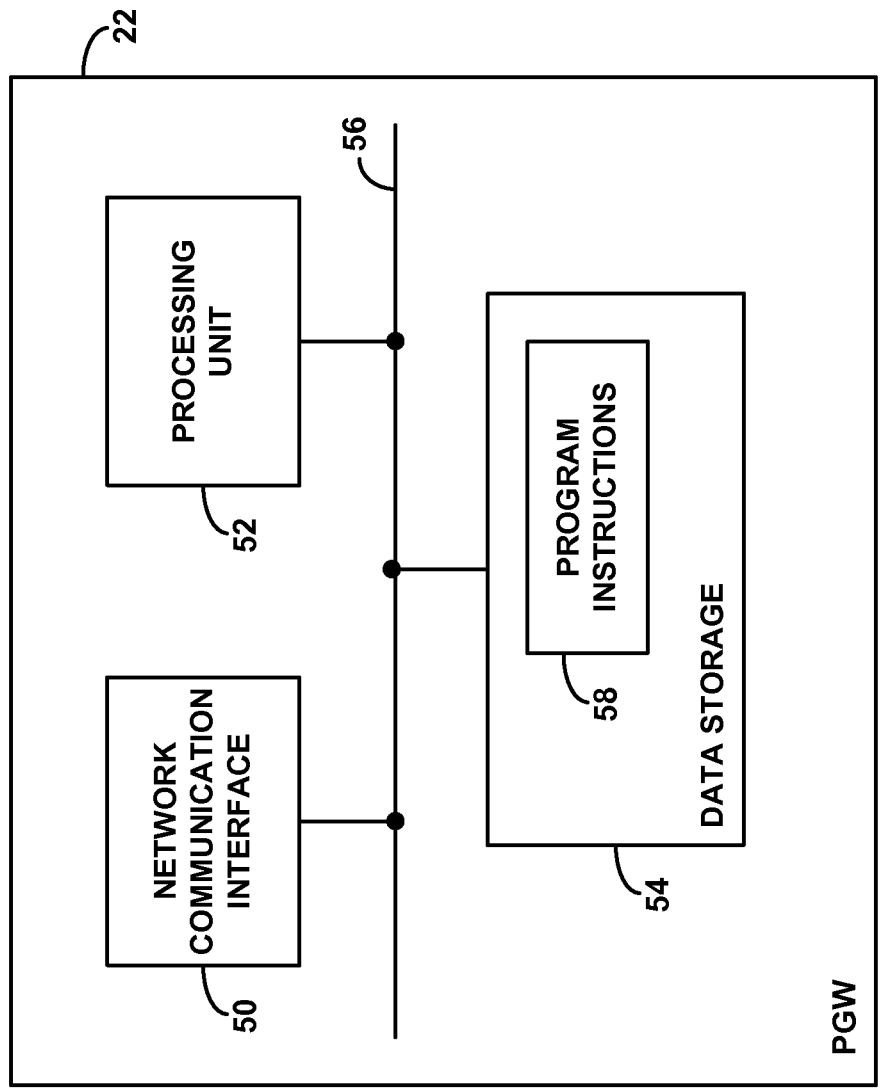
FIG. 3 is a simplified block diagram of a gateway operable in the arrangement of FIG. 1.

Finally, FIG. 3 is a simplified block diagram of a PGW that may implement functions of the present method. As shown in FIG. 3, the PGW includes a network communication interface 50, a processing unit 52, and data storage 54, all of which may be communicatively linked together by a system bus, network, or other connection mechanism 56.

Network communication interface 50 functions to facilitate communication with various other network entities shown, such as base station 12, PCRF 30, and transport network 24. As such, the interface 40 may include one or more network interface modules, such as Ethernet network interface modules for instance or may take any of a variety of other forms, supporting wireless and/or wired communication with these and other components.

Processing unit 52 may then comprise one or more general purpose processors (e.g., microprocessors) and/or one or more special purpose processors (e.g., application specific integrated circuits). Data storage 54 may comprise one or more volatile and/or non-volatile non-transitory storage components, such as optical, magnetic, or flash storage, and may be integrated in whole or in part with processing unit 52.

As shown, data storage 54 may hold program instructions 58 that are executable or interpretable by processing unit 52 to carry out various functions described herein. By way of example, these functions may include receiving via the network communication interface information indicative of a change to a service level of connectivity between a UE and a network. The service level may be stored in a local policy profile associated with the UE. The functions may further include, transmitting via the network communication interface the information for receipt by the UE. Further, the functions may include determining failure of the gateway to receive an acceptance response from the UE indicative of the UE accepting the change to the service level. Additionally, the functions may include, responsive to determining the failure, updating the gateway policy profile to make the change only if the change corresponds to a decrease in the service level and not if the change corresponds to an increase in the service level.

Here again, these functions may be carried out in line with the discussion above or in other ways. In a specific example implementation, the service level of the connectivity may be a guaranteed-bit-rate for data traffic, or a voice quality of voice call traffic. Whether or not the gateway updates the policy profile, the gateway may then enforce the service level indicated in the policy profile.

Exemplary embodiments have been described above. Those skilled in the art will understand, however, that changes and modifications may be made to these embodiments without departing from the true scope and spirit of the invention.

We claim:

1. A method comprising:
providing, by a gateway, connectivity between a user equipment device (UE) and a network at a service level indicated in a gateway policy profile associated with the UE;
receiving, by the gateway, information indicative of a change to the service level, wherein the change corresponds to an upgrade of the service level or a downgrade of the service level;
transmitting, by the gateway, the information for receipt by the UE;
determining, by the gateway, failure of the gateway to receive an acceptance response from the UE indicative of the UE accepting the change; and
responsive to the receiving of the information by the gateway and the determining of the failure, (i) updating, by the gateway, the gateway policy profile to make the change if the change corresponds to the downgrade, or (ii) maintaining, by the gateway, the gateway policy profile unchanged if the change corresponds to the upgrade.

2. The method of claim 1, further comprising:
providing, by the gateway based on the gateway policy profile, the connectivity having: (i) a decreased service level if the change corresponds to the downgrade, or (ii) the service level unchanged if the change corresponds to the upgrade.

3. The method of claim 2, further comprising:
providing to a base station serving the UE a bearer-update request that requests update of a bearer connection between the UE and the gateway to have the decreased service level of the connectivity if the change corresponds to the downgrade.

4. The method of claim 1, wherein the connectivity provided by the gateway supports a maximum bit rate of data traffic, the method further comprising:
enforcing, by the gateway, (i) a decreased maximum bit rate if the change corresponds to the downgrade, or (ii) the maximum bit rate unchanged if the change corresponds to the upgrade.

5. The method of claim 1, wherein the connectivity provided by the gateway supports a voice call quality of voice call traffic, the method further comprising:
enforcing, by the gateway, (i) a decreased voice call quality if the change corresponds to the downgrade, or (ii) the voice call quality unchanged if the change corresponds to the upgrade.

6. The method of claim 1, wherein the determining of the failure comprises:
receiving, by the gateway, a rejection response from the UE indicative of the UE rejecting the change.

7. The method of claim 1, wherein the gateway is configured to wait a threshold period of time to receive the acceptance response from the UE after the transmitting of the information by the gateway, wherein the determining of the failure comprises:
determining, by the gateway, that the threshold period of time passed without the gateway receiving the acceptance response from the UE.

8. A system configured to provide connectivity between a user equipment device (UE) and a network, the system comprising:
a policy rules server that includes a policy profile associated with the UE, wherein the policy profile is indicative of a quality of service (QOS) of the connectivity between the UE and the network;
a gateway configured to enforce the QOS of the connectivity between the UE and the network, wherein the gateway is further configured to: (i) receive information from the policy rules server indicative of a change to the policy profile, wherein the change corresponds to an upgrade of the QOS or a downgrade of the QOS, (ii) transmit the information for receipt by the UE, (iii) determine failure of the gateway to receive an acceptance response from the UE indicative of the UE accepting the change, and (iv) responsive to the determined failure after the transmission of the information by the gateway, enforce a decreased QOS if the change corresponds to the downgrade or keep the QOS unchanged if the change corresponds to the upgrade; and
a base station serving the UE and configured to provide, via a bearer connection between the base station and the gateway, the connectivity to the UE.

9. The system of claim 8, wherein the gateway is configured to enforce the decreased QOS if the change corresponds to the downgrade by providing, to the base station, a bearer-update request that requests update of the bearer connection to have the decreased QOS of the connectivity.

10. The system of claim 8, wherein the connectivity supports a maximum bit rate of data traffic, wherein the gateway is configured to: (i) enforce a decreased maximum bit rate if the change corresponds to the downgrade, or (ii) keep the maximum bit rate unchanged if the change corresponds to the upgrade.

11. The system of claim 8, wherein the connectivity supports a voice call quality of voice call traffic, wherein the gateway is configured to: (i) enforce a decreased voice call quality if the change corresponds to the downgrade, or (ii) keep the voice call quality unchanged if the change corresponds to the upgrade.

12. The system of claim 8, wherein the gateway is configured to determine the failure based on the gateway receiving a rejection response from the UE indicative of the UE rejecting the change.

13. The system of claim 8, wherein the gateway is configured to wait a threshold period of time to receive the acceptance response from the UE after the transmission of the information by the gateway, and wherein the gateway is configured to determine the failure based on the gateway determining that the threshold period of time passed without the gateway receiving the acceptance response from the UE.

14. A gateway configured to provide connectivity between a user equipment device (UE) and a network at a service level indicated in a gateway policy profile associated with the UE, the gateway comprising:
 a network communication interface;
 a processing unit;
 data storage;
 program instructions stored in the data storage and executable by the processing unit to carry out functions comprising:
  receiving, via the network communication interface, information indicative of a change to the service level, wherein the change corresponds to an increase of the service level or a decrease of the service level;
  transmitting, via the network communication interface, the information for receipt by the UE;
  determining, by the gateway, failure of the gateway to receive an acceptance response from the UE indicative of the UE accepting the change; and
  responsive to the receiving of the information by the gateway and the determining of the failure, updating the gateway policy profile to make the change only if the change corresponds to a decrease in the service level and not if the change corresponds to an increase in the service level.

15. The gateway of claim 14, the functions further comprising:
 providing, by the gateway based on the gateway policy profile, the connectivity having: (i) a decreased service level if the change corresponds to the decrease in the service level, or (ii) the service level unchanged if the change corresponds to the increase in the service level.

16. The gateway of claim 15, further comprising:
 providing to a base station serving the UE a bearer-update request that requests update of a bearer connection between the UE and the gateway to have the decreased service level of the connectivity if the change corresponds to the decrease in the service level.

17. The gateway of claim 14, wherein the connectivity provided by the gateway supports a maximum bit rate of data traffic, the functions further comprising:
 enforcing, by the gateway, (i) a decreased maximum bit rate if the change corresponds to the decrease in the service level, or (ii) the maximum bit rate unchanged if the change corresponds to the increase in the service level.

18. The gateway of claim 14, wherein the connectivity provided by the gateway supports a voice call quality of voice call traffic, the functions further comprising:
 enforcing, by the gateway, (i) a decreased voice call quality if the change corresponds to the decrease in the service level, or (ii) the voice call quality unchanged if the change corresponds to the increase in the service level.

19. The gateway of claim 14, wherein the determining of the failure comprises:
 receiving, by the gateway, a rejection response from the UE indicative of the UE rejecting the change.

20. The gateway of claim 14, wherein the gateway is configured to wait a threshold period of time to receive the acceptance response from the UE after the transmitting of the information by the gateway, wherein the determining of the failure comprises:
 determining, by the gateway, that the threshold period of time passed without the gateway receiving the acceptance response from the UE.

* * * * *